(12) United States Patent
Zafiroglu et al.

(10) Patent No.: US 11,851,890 B2
(45) Date of Patent: Dec. 26, 2023

(54) FLOORCOVERINGS WITH PLANARLY VARIABLE PROPERTIES

(71) Applicant: ENGINEERED FLOORS LLC, Dalton, GA (US)

(72) Inventors: Dimitri Zafiroglu, Centreville, DE (US); Stephen Tsiarkezos, Elkton, MD (US); John Joseph Matthews Rees, Chattanooga, TN (US)

(73) Assignee: ENGINEERED FLOORS LLC, Dalton, GA (US)

( * ) Notice: Subject to any disclaimer, the term of this patent is extended or adjusted under 35 U.S.C. 154(b) by 237 days.

(21) Appl. No.: 15/979,934

(22) Filed: May 15, 2018

(65) Prior Publication Data

US 2018/0328045 A1 Nov. 15, 2018

Related U.S. Application Data

(60) Provisional application No. 62/506,139, filed on May 15, 2017.

(51) Int. Cl.
| | |
|---|---|
| *E04F 15/02* | (2006.01) |
| *A47G 27/02* | (2006.01) |
| *B32B 3/30* | (2006.01) |
| *B32B 7/12* | (2006.01) |
| *B32B 27/36* | (2006.01) |

(Continued)

(52) U.S. Cl.
CPC ........ *E04F 15/02161* (2013.01); *A47G 27/02* (2013.01); *B32B 3/30* (2013.01); *B32B 7/12* (2013.01); *B32B 27/36* (2013.01); *E04F 15/107* (2013.01); *B32B 38/06* (2013.01); *B32B 2471/00* (2013.01); *E04F 2203/08* (2013.01)

(58) Field of Classification Search
CPC .................................................. E04F 2203/08
See application file for complete search history.

(56) References Cited

U.S. PATENT DOCUMENTS 1,980,598 A * 11/1934 Saponoff ................ A47G 27/02
52/101
4,212,691 A * 7/1980 Potosky .................. B05C 19/00
118/239

(Continued)

FOREIGN PATENT DOCUMENTS

| WO | 2015060778 A1 | 4/2015 |
| WO | 2016057082 A1 | 4/2016 |

OTHER PUBLICATIONS

Merriam-Webster Dictionary—"tile" (Year: 2022).*

(Continued)

*Primary Examiner* — Frank J Vineis
*Assistant Examiner* — Nicole T Gugliotta
(74) *Attorney, Agent, or Firm* — PATENT PORTFOLIO BUILDERS PLLC

(57) ABSTRACT

A planar floor covering is formed having a top face and a bottom face opposite the top face, a length, a width perpendicular to the length, a top surface, a bottom surface opposite the top surface, a height between the top surface and the bottom surface, and physical properties or characteristics that vary across at least one of the length, the width and the height. The physical properties or characteristics include material composition, weight, density, directionality, stiffness, compressibility, elasticity and thickness.

16 Claims, 10 Drawing Sheets

(51) Int. Cl.
*E04F 15/10* (2006.01)
*B32B 38/06* (2006.01)
*B32B 5/02* (2006.01)
*B32B 3/20* (2006.01)
*B32B 5/14* (2006.01)
*B32B 7/022* (2019.01)
*B32B 27/06* (2006.01)
*B32B 3/02* (2006.01)
*B32B 7/04* (2019.01)
*B32B 27/30* (2006.01)

(56) References Cited

U.S. PATENT DOCUMENTS

| | | | |
|---|---|---|---|
| 4,446,190 A | 5/1984 | Pernici | |
| 4,504,537 A * | 3/1985 | Mussallem, Jr. | B32B 5/06 428/167 |
| 4,637,942 A | 1/1987 | Tomarin | |
| 5,082,708 A * | 1/1992 | Kauffman | B29C 70/26 428/47 |
| 5,082,712 A | 1/1992 | Starp | |
| 5,806,270 A * | 9/1998 | Solano | E04F 15/02 52/181 |
| 7,425,359 B2 * | 9/2008 | Zafiroglu | B32B 3/28 428/131 |
| 2005/0118398 A1 | 6/2005 | Reichwein et al. | |
| 2005/0158515 A1 * | 7/2005 | Nolt | A62B 3/00 428/143 |
| 2006/0177633 A1 | 8/2006 | Han et al. | |
| 2011/0151174 A1 * | 6/2011 | Hainbach | B32B 3/02 428/78 |
| 2012/0324805 A1 | 12/2012 | Reichwein et al. | |
| 2013/0055665 A1 | 3/2013 | Qiong | |

OTHER PUBLICATIONS

International Search Report and Written Opinion dated Jul. 27, 2018 in related International Application No. PCT/US2018/032237.

Extended European Search Report in corresponding/related European Application No. EP 18 80 1443 dated Jan. 27, 2021.

Office Action dated Feb. 3, 2023 in related/corresponding CA Application No. 3,062,862.

* cited by examiner

FLOORCOVERINGS WITH PLANARLY VARIABLE PROPERTIES

CROSS-REFERENCE TO RELATED APPLICATIONS

This application claims priority to U.S. Provisional Patent Application No. 62/506,139, filed May 15, 2017, the entire contents of which is incorporated herein by reference.

TECHNICAL FIELD

Embodiments of the subject matter disclosed herein relate to surface coverings, including floor covering tiles.

BACKGROUND

Surface coverings, and in particular floor coverings, are typically constructed as uniformly as possible. Uniformity of construction includes a uniform thickness. For modular floor coverings such as floor tiles, each tile should have essentially the same thickness, should lay flat on the floor, and should stay flat to avoid uneven matching of the edges of adjacent tiles and bulging or warping of the tiles on the floor as temperature and humidity vary. For area coverings including broadloom carpets and sheets of vinyl floorcoverings, bulging or warping at seams or between seams also needs to be avoided. While broadloom floorcoverings can be installed under tension to avoid bulging and warping, modular tiles can not be installed under tension and are especially susceptible to warping and bulging.

Modular tile flooring is often constructed with polymeric materials that undergo considerable expansion and contraction with changes in temperature and humidity. Therefore, individual modular flooring tiles expand or shrink during the manufacturing process, during installation or after installation as the individual tiles lay on the floor. Expansion and shrinkage result in cracks at the seams between adjacent tiles or bulging or doming at the seams or within individual tiles due to crowding. Curling and bulging can occur during the manufacturing process, during installation, or after installation as the individual tiles lay on the floor.

To prevent expansion, shrinkage, curling and doming, commercial grade flooring tiles include stiff sub-layers that do not change dimension to a significant degree with variations of temperature and humidity. These sub-layers contain materials such as glass fibers or aramid fibers that resist thermal or hygroscopic expansion or contraction. Other attempts at preventing expansion, shrinkage, curling and doming utilize heavy elastic backings to pull a stiff but lighter face layer down to the floor and to hold the face layer against the floor under the force of gravity.

These existing solutions, however, add weight to the flooring product or adversely affect desired qualities, for example, surface softness, in the flooring product. The addition of glass fibers, aramid fibers or heterogeneous elastic layers also affects the recycling capability of the flooring product. Therefore, floorcoverings that provide thermal and hygroscopic planar dimensional stability in tiles that avoid expansion, shrinkage, curling and doming without adding excessive weight, and while preserving recyclability and the desired cushion qualities of the composite flooring are desired. Treatments that use lower cost materials, e.g., re-cycled materials, and rely on geometry rather than the addition of stiff stabilizing layers or heavy elastic layers to accommodate the thermal and hygroscopic changes, are particularly desirable.

SUMMARY

Exemplary embodiments are directed to a floor covering tile having a top face and a bottom face opposite the top face. The tile has a length, a width perpendicular to the length, and a height perpendicular to the width and length and extending between a top surface and a bottom surface opposite the top surface. The length and width of the floor covering tile define an area of the floor covering tile. The floor covering tile has physical properties or characteristics that vary along the plane of the top surface or bottom surface, i.e., at least along one of the length or the width. These physical properties include at least one of material composition, weight, density, directionality, stiffness, compressibility, thickness, and elasticity.

Exemplary embodiments are directed to a floor covering and methods for making and using the floor covering. The floor covering includes a planar layer having a length and a width perpendicular to the length. The length and width define an area of a first surface of the planar layer. A plurality of zones is disposed across the area of the first surface of the planar layer. Each zone occupies a portion of the area and contains a variation in at least one physical property of the planar layer. Suitable physical properties include, but are not limited to, material composition, weight, density, directionality, stiffness, compressibility, elasticity and thickness. In one embodiment, the zones in the plurality of zones are a plurality of discrete zones. In one embodiment, each zone contains a variation in only one physical property of the planar layer. In one embodiment, each zone occupies an equal portion of the area of the first surface of the planar layer and has an identical shape.

In one embodiment, the zones the plurality of zones form a regular pattern across the first surface of the planar layer. In one embodiment, the plurality of zones form a plurality of bands extending across the first surface of the planar layer. In one embodiment, the plurality of bands contains at least one of a plurality of parallel bands and a plurality of overlapping bands. In one embodiment, the floorcovering also includes a second surface opposite the first surface and a thickness between the first surface and the second surface. Each zone extends into the planar layer at least partially through the thickness of the planar layer. In one embodiment, each zone extends an equal distance through the thickness. In one embodiment, the floor covering includes a face layer attached to the second surface of the planar layer. In one embodiment, the floor covering includes an adhesive layer disposed between the face layer and the planar layer. In one embodiment, the floor covering is a tile having a plurality of edges, and each zone in the plurality of zones is disposed along the plurality of edges.

Exemplary embodiments are also directed to a method for making a floor covering. A tile having a planar layer is formed, and at least one physical property of the planar layer is modified in a plurality of zones disposed across a first surface of the planar layer. Each zone occupies a portion of an area of the first surface and contains a variation in at least one physical property of the planar layer. In one embodiment, modifying the physical property of the planar layer involves embossing the first surface or making cuts into the first surface. In one embodiment, modifying the physical property of the planar layer involves removing material from the first surface, forming channels in the first surface, forming indentations in the first surface or forming protrusions on the first surface. In one embodiment, modifying the physical property of the planar layer involves heating and thermo-bonding the plurality of zones on the first surface. In one embodiment, modifying the physical property of the planar layer involves at least one of depositing materials onto the first surface and incorporating materials into the planar layer from the first surface.

In one embodiment, a face layer is attached to a second surface of the planar layer opposite the first surface, and at least one physical property in at least one of the planar layer and the face layer is modified. In one embodiment, a face layer is attached to a second face of the planar layer opposite the first face following modification of the at least one physical property of the planar layer in the plurality of zones.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
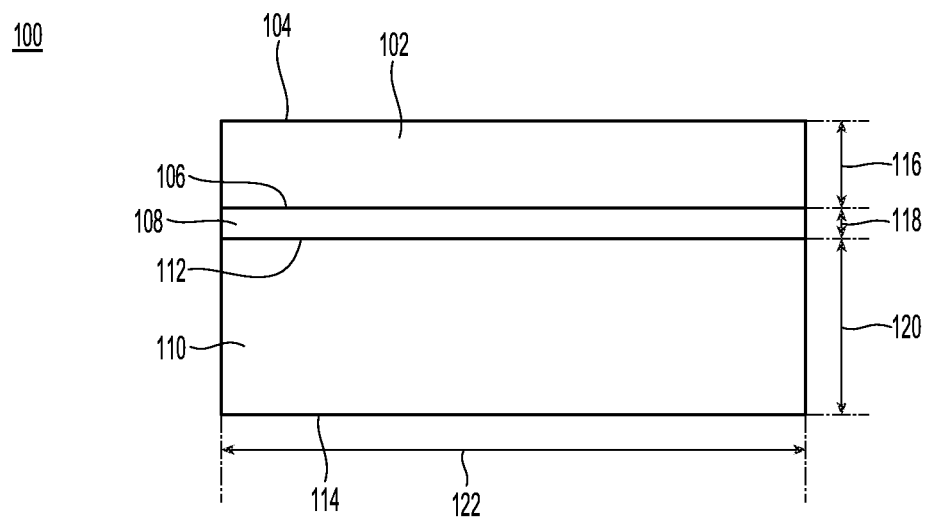
FIG. 1 is a schematic representation of a cross section of an embodiment of a floor covering tile.
Figure 2:
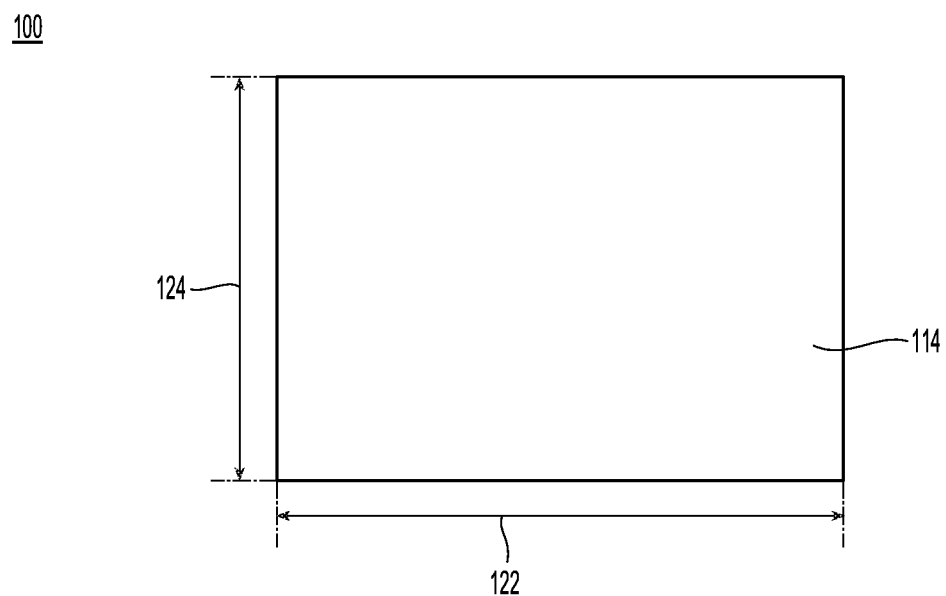
FIG. 2 is a schematic representation of a bottom surface of the floor covering tile of FIG. 1.

Exemplary embodiments are directed to improved flooring products that avoid the problems of expansion, shrinkage, curling and doming that occur during the manufacturing process, during installation or after installation of the flooring product. Suitable flooring products include, but are not limited to, modular floor coverings such as floor covering tiles. Referring initially to FIGS. 1 and 2, exemplary embodiments are directed to a floor covering 100. In one embodiment, the floor covering is constructed from and contains a single planar layer 110. The planar layer 110 includes a first or bottom surface 114 and a second or top surface 112 opposite the first surface. In one embodiment, the floor covering includes a plurality of separate layers that are laminated together. As illustrated in FIG. 1, the floor covering optionally includes, in addition to the planar layer, a face layer 102 having a top face 104 and a bottom face 106 opposite the top face. The bottom face 106 is positioned toward the second surface 112 of the planar layer, and the top face 104 is exposed when the floor covering is installed. Suitable face layers include, but are not limited to, a stitch-bonded fabric, a tufted fabric, needle-punched fabrics, embossed fabrics, bulked fabrics, brushed and bulked fabrics, woven fabrics, knits fabrics, loop pile fabrics and solid layers, for example, vinyl and elastomers. In one embodiment, the planar layer 110 is in contact with the bottom face 106 of the face layer 102, serving as a backing to the face layer.

In one embodiment, the floor covering is configured as a unitary area cover, that can be rolled and unrolled onto the floor. Alternately, the floor covering is configured as a tile. In general, the floor covering 100, including the planar layer 110, the face layer 102 and any other layers, has a length 122 and a width 124 perpendicular to the length. The length and width define the area of the top face 104 of the face layer and the first surface 114 of the planar layer. In one embodiment, this area is the area of one flooring covering tile, for example, 1 ft×1 ft (0.3 m×0.3 m), 2 ft×2 ft (0.6 m×0.6 m) or 3 ft×3 ft (0.9 m×0.9 m). The distance between the top face and the first surface defines an overall height or thickness of the floor covering. Each individual layer of the floor covering also includes a height or thickness. The first surface and the second surface of the planar layer defines the height or thickness 120 of the planar layer.

Having a length, width and thickness, the planar layer 110 is a three-dimensional structure. The planar layer 110 has physical properties that vary along the three dimensions and at least along one of the length, or the width. In addition to the physical properties, the thickness of the planar layer can be varied. As used herein, thickness is also considered a physical property of the planar layer. Other physical properties include, but are not limited to, material composition, weight, density, directionality, stiffness, compressibility, elasticity, and combinations thereof. Therefore, at least one or up to all of these physical properties varied across the area of the planar layer. In one embodiment, some of the physical properties are constant across or through the planar layer while other physical properties are varied in one or more dimensions, i.e., length, width and thickness. For example, the thickness of the planar layer is constant or substantially uniform across the area of the planar layer, while other physical properties are varied, e.g., physical composition.

The variations in the planar layer can be uniform across the desired dimension or can change from zone to zone across the area or within the thickness of the planar layer. For example, the thickness can change at specific points or in a regular pattern across the area of the planar layer resulting in a locally-reduced height or thickness in the planar layer. The magnitude of the changes can be constant along the desired dimension or can vary. In one embodiment, the planar layer has a locally varying composition, i.e., chemical or physical composition. For example, different zones of the planar layer are constructed from different materials or formed from the same material having fillers or additives incorporated into a plurality of zones within the planar layer to change the chemical or physical composition before or after the formation of the planar layer. In one embodiment, the properties of the planar layer are modified in a plurality of zones across and within the planar layer using mechanical processes including, but not limited to, embossing, compressing, cutting, heating and combinations thereof. In one embodiment, the planar layer has locally varying properties including, but not limited to, weight, density, directionality, stiffness, compressibility, elasticity, and rate of expansion or contraction with variations of temperature or humidity. In one embodiment different areas of the planar layer are printed or impregnated to various depths from at least one of the top surface and the bottom surface alter local properties within the planar layer.

In one embodiment, the floor covering 100 includes an adhesive layer 108 located between the bottom face 106 of the face layer 102 and the second surface 112 of the planar layer 110. The adhesive layer bonds the fibrous face layer to the planar layer. In one embodiment, the fibrous face layer is thermally laminated to the planar layer by applying heat and pressure though the fibrous face layer. In one embodiment, thermal lamination is conducted with the adhesive layer present between the face layer and the planar layer. Alternatively, the face layer is directly thermally laminated to the planar layer without the use of an adhesive layer pre-attached to the face layer or the planar layer. In one embodiment modifications to the physical properties of the planar layer are achieved simultaneously during thermal lamination.

When the floor covering includes a face layer, which can be a fibrous face layer, and an adhesive layer, the face layer has a face layer thickness 116, and the adhesive layer has an adhesive layer thickness 118. In one embodiment, the thickness of the planar layer 120 before modification to the physical properties of the planar layer is greater than the combined fibrous face layer thickness 116 and adhesive layer thickness 118. Lamination and modifications to the physical properties of the planar layer can result in a composite planar layer with a final overall thickness less than the combined original thicknesses of the three original layers.

In one embodiment, modifications to one or more physical properties in the planar layer 110 are made in accordance with a desired or pre-determined pattern across the area and through the thickness of the planar layer. The desired pattern defines a plurality of zones disposed across the area of the planar layer. In one embodiment, the plurality of zones also extends at least partially into the thickness of the planar layer. When the floor covering includes additional layers such as a face layer and the adhesive layer, these zones can also extend into the additional layers. Therefore, each zone represents a variation in at least one physical property of the planar layer. In one embodiment, each zone comprises a variation in one and only one physical property of the planar layer. Each zone occupies a portion of the area of the planar layer. In one embodiment, each zone occupies an equal portion of the area of the planar layer. Alternatively, each zone occupies a uniquely sized portion of the area or each zone occupies one of two or more uniquely sized portions. In one embodiment, each zone extends an equal distance through the thickness of the planar layer. Alternately, each zone extends a unique distance into the thickness of the planar layer, or the plurality of zones extend into the thickness of the planar layer by two or more unique distances.

In one embodiment, each zone has an identical shape. Alternatively, each zone has a unique shape, or the plurality of zones have two or more unique shapes. In one embodiment, the plurality of zones is a plurality of discrete zones. Alternatively, two or more of the zones in the plurality of zones overlap. When each zone represents a change in only one physical property of the planar layer, overlapping the zones results in modifications of more than one physical property on the overlapping areas.

In one embodiment, the zones in the plurality of zones form a regular pattern across the first surface of the planar layer. Alternatively, the zones are arranged in a random pattern. In one embodiment, the plurality of zones is a plurality of bands extending across the first surface of the planar layer. Each band has a band length and a band width, and the band length is greater than the band width. The lengths and widths of bands can be parallel to or divergent to the length and width of the planar layer. In one embodiment, the plurality of bands includes at least one of a plurality of parallel bands and a plurality of bands that cross. When the floor covering is a floor covering tile, the floor covering has a plurality of edges. In one embodiment, each zone in the plurality of zones is disposed along the plurality of edges. Each zone can intersect one of more of the edges or can be adjacent but spaced from one or more of the edges.

The following embodiments illustrate exemplary shapes and sizes of zones and arrangements of zones across the first surface of the planar layer. The zones are arranged to achieve the desired patterns through changes in the height or thickness of the planar layer. These changes can vary within a given zone and along the length and width. The illustrated patterns, however, can be associated with changes in any of the desired properties. Patterns illustrated as changes in the height or thickness of the planar layer when applied to other physical properties can indicate modifications of those other properties that do not extend the entire height or thickness of the planar layer.

While illustrated as zones running along and extending into the first surface of the planar layer, the zones of changes in physical properties can also be associated with patterns running along and extending into the second surface of the planar layer. When the floor covering includes additional layers including, for example, the face layer and adhesive layer, the patterns of zones of changes in physical properties can be created in the planar layer before attachment to the face layer, during attachment to the face layer or after attachment to the face layer.

Figure 3:
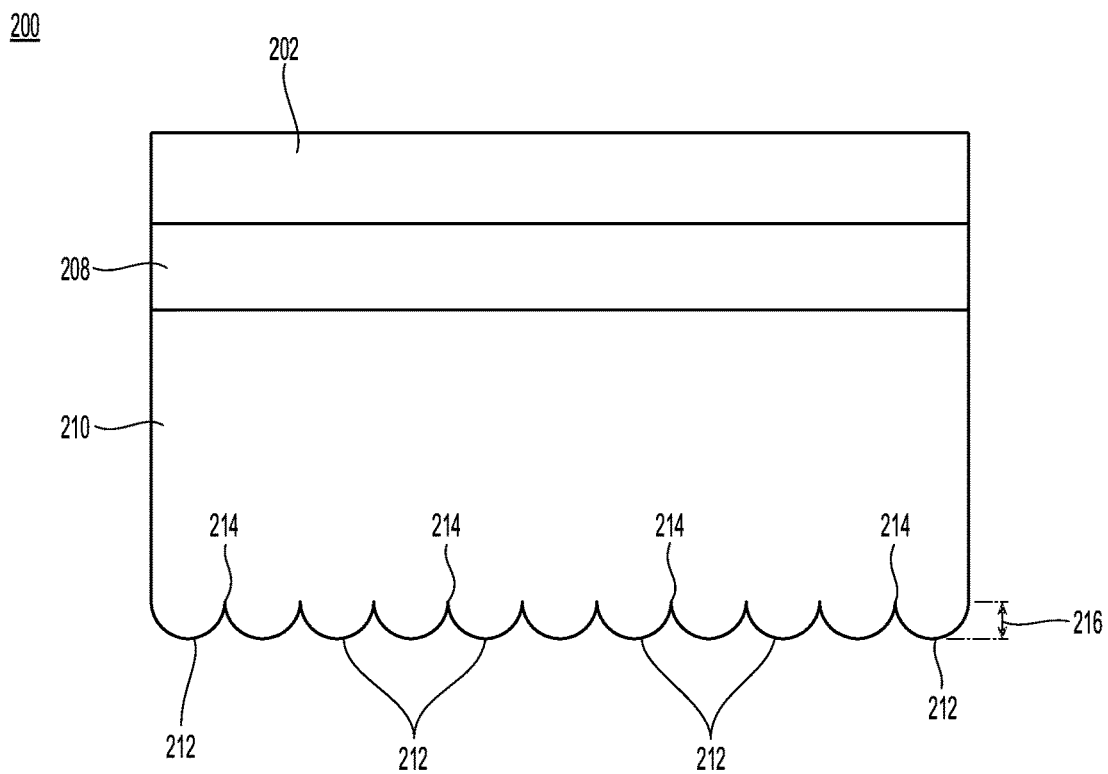
FIG. 3 is a schematic representation of the cross section of another embodiment of a floor covering tile.
Figure 4:
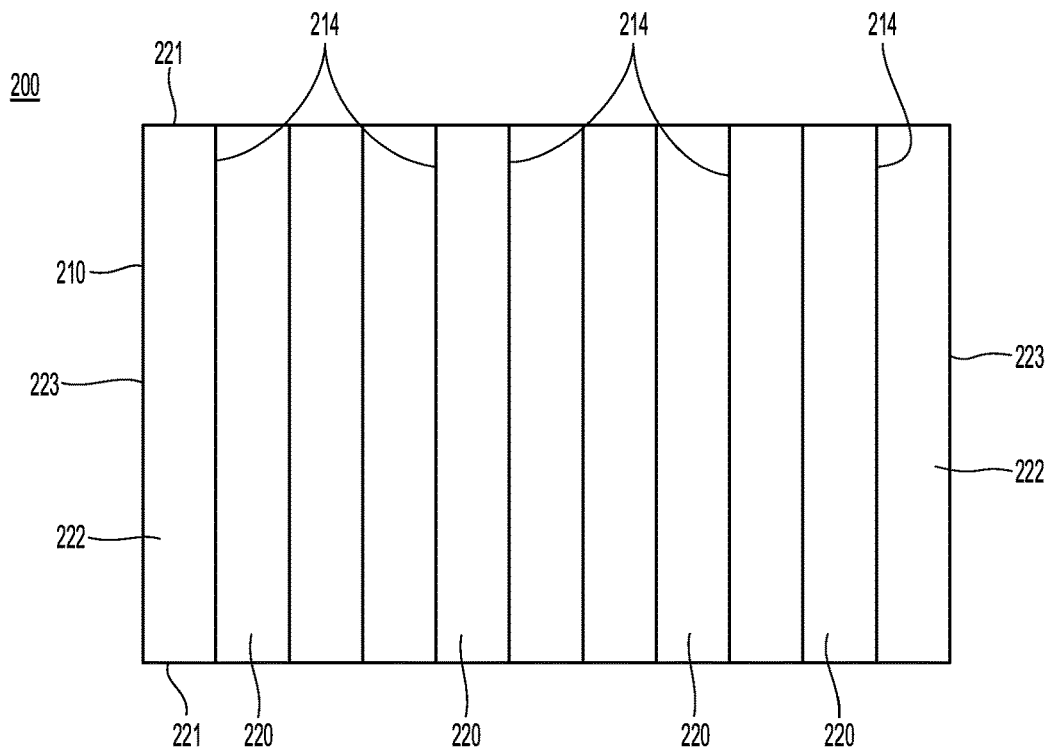
FIG. 4 is a schematic representation of a bottom surface of the floor covering tile of FIG. 3.

Referring to FIGS. 3 and 4, in one embodiment the floor covering 200 includes a planar layer 210. As illustrated, the floor covering also includes a face layer 202 and an adhesive layer 208; however, these layers are optional. The surface of the planar layer to be placed against the floor or other surface to be covered includes a desired pattern of a plurality of zones. The plurality of zones includes a plurality of parallel ridges 212 that run along either the length or width of the planar layer 210. Therefore, the zones are a plurality of discrete, parallel bands forming a regular pattern across the first surface. In one embodiment, each zone occupies an equal portion of the area of the first surface, and the plurality of zones form a regular pattern. In one embodiment, the ridges are rounded, as shown in FIG. 3. Alternatively, the ridges have an angular or orthogonal shape with relatively sharp corners. The shape of the ridges can be the result of the methods used to form the ridges. In one embodiment, the ridges are formed or defined by a series of parallel lines 214 or indentations extending into the planar layer from the bottom surface. The parallel lines extend a desired or predefined distance 216 into the planar layer. In one embodiment, the parallel lines extend between adjacent zones and define lines of separation between adjacent zones. Therefore, as illustrated, each zone has a generally rectangular shape. The plurality of zones includes interior zones 220 defined between opposite edges 221 and pairs of parallel lines 214, and two exterior zones 222 defined between the opposite edges and between the edges 223. The embodiment illustrated in FIGS. 3 and 4 is particularly effective in preventing the tendency of a tile to warp up along the edges 223 (FIG. 4) by allowing the floorcovering to relax down along the edges.

As illustrated, each zone has identical dimensions across the area of the first surface and into the thickness of the planar layer. This results in the regular pattern of zones. Alternatively, the size of the zones may be varied, for example, by varying the spacing between parallel lines of indentations. In one embodiment, the parallel lines of indentations are closer together near the edges 223 of the floor covering, which overcomes a particularly strong tendency to warp up along these edges 223. In one embodiment, the depth of the parallel lines of indentations extending into the thickness of the planar layer varies among the parallel lines. In one embodiment, the depth the parallel lines of indentations extend into the thickness of the planar layer varies along the length of each parallel line, i.e., is deeper adjacent the edges and shallower towards the middle. In one embodiment, the parallel lines are parallel curvilinear lines.

In one embodiment, the planar layer 210 is treated or modified before or after attachment to a face layer. Suitable methods for forming the lines and ridges include, but are not limited to, cutting the lines and ridges using an edge tool or embossing the bottom surface with heat to form the parallel indentation lines in the desired direction, i.e., length, width or diagonal, to the desired depth. The ridges preferably extend and maintain an original height or thickness of the planar layer. Therefore, the overall thickness of the planar layer or floor covering remains unchanged. Alternately, some thickness is lost. Regardless of any changes in thickness associated with the formation of the parallel lines and ridges, the resulting floor covering is a flat or slightly doming structure, suitable for use as a flooring tile.

Figure 5:
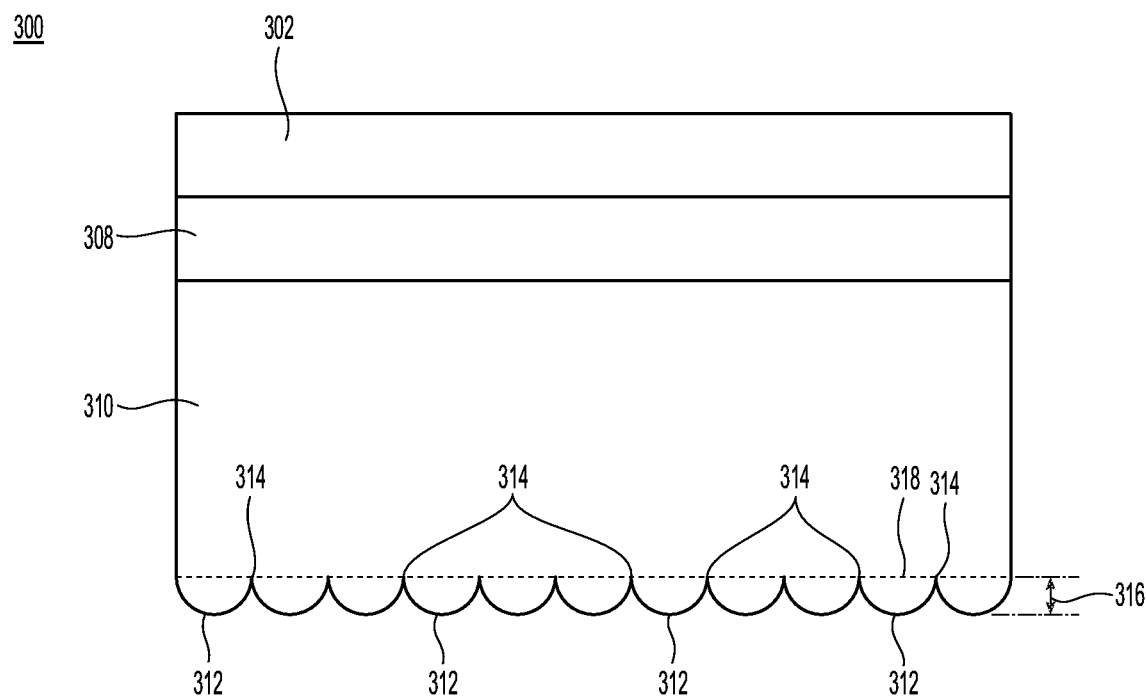
FIG. 5 is a schematic representation of a cross section of another embodiment of a floor covering tile.
Figure 6:
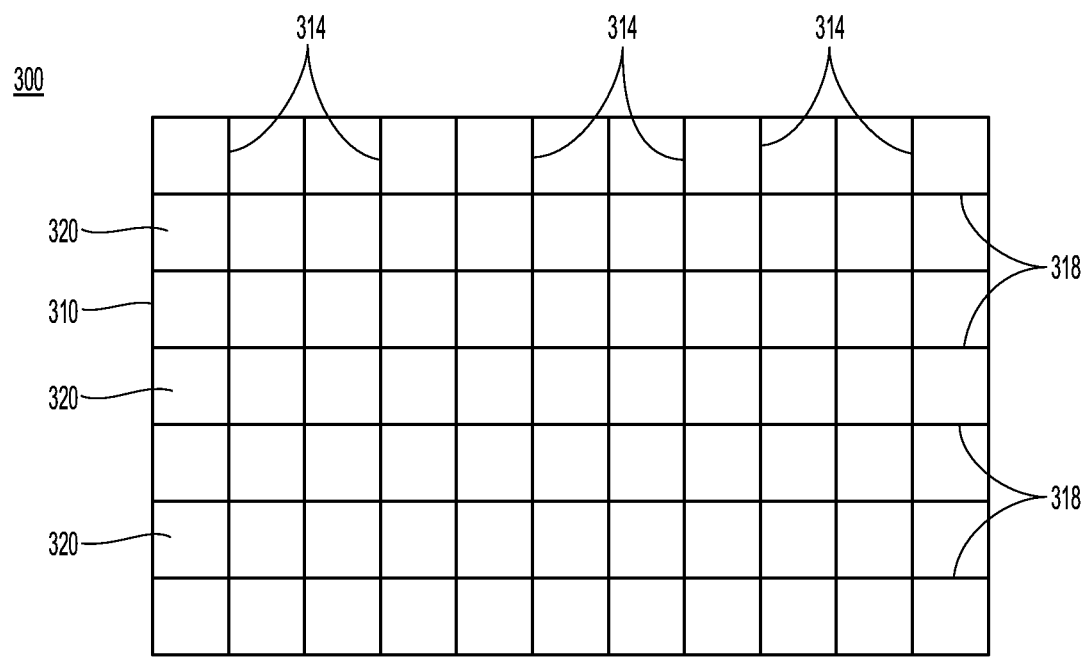
FIG. 6 is a schematic representation of a bottom surface of the floor covering tile of FIG. 5.

Referring now to FIGS. 5 and 6, in one embodiment the floor covering 300 includes a planar layer 310. The floor covering is illustrated with an optional face layer 302 and an optional adhesive layer 308 attached to the planar layer 310. The surface of the planar layer to be placed against the covered floor or surface includes a desired pattern of a plurality of zones. The plurality of zones includes a plurality of parallel first ridges 312 on the first surface that run in a first direction along either the length or width of the planar layer 310 and a plurality of parallel second ridges 320 running a second direction perpendicular to the first direction. Therefore, the zones are a plurality of intersecting bands forming a regular pattern, e.g., a grid, across the first surface. In one embodiment, each zone occupies an equal portion of the area of the first surface. This arrangement is particularly suitable to counter a tendency for the floorcovering to warp up or dome in both the longitudinal and cross directions.

To create and define the parallel first ridges and the parallel second ridges, the floor covering includes a desired pattern of two sets of parallel lines running in two different directions and forming a grid. The two sets of parallel lines include a plurality of first parallel lines of indentations 314 and a plurality of second parallel lines of indentations 318 extending into the planar layer from the first surface. The first parallel lines of indentations separate and define the plurality of parallel first ridges 312. The second parallel lines of indentations separated and define the plurality of second ridges 320. As the first parallel lines of indentations are perpendicular to the second parallel lines of indentations, the first ridges and second ridges are interrupted by the two sets of parallel lines, which results in a grid of individual elevated areas. Therefore, in one embodiment, each zone in the plurality of zones can be one of the individual elevated areas. The first and second parallel lines of indentations extend into the planar layer a desired or predefined depth 316. This predefined depth can range up to most of the height or thickness of the planar layer. Each individual ridge or individual elevated area is defined and bound by combinations of edges and parallel lines of indentations.

As illustrated, each zone has identical dimensions across the area of the first surface and into the thickness of the planar layer. This results in the regular pattern or grid of zones. Alternatively, the size of the zones may be varied, for example, by varying the spacing between parallel lines in at least one of the first parallel lines of indentations and the second parallel lines of indentations. In one embodiment, the parallel lines of indentations are closer together near the edges of the floor covering. In one embodiment, the depth the first and second parallel lines of indentations extend into the thickness of the planar layer varies among the parallel lines. In one embodiment, the depth the first and second parallel lines of indentations extend into the thickness of the planar layer varies along the length of each parallel line, i.e., is deeper adjacent the edges and shallower towards the middle.

As with the single set of parallel lines, the backing or planar layer 310 of the floor covering may be treated or modified before or after attachment to the face layer. The treatment or modification balances a natural tendency of the floor covering composite to "curl up" when the top face of the face layer, which was heated, shrinks as it cools down. Suitable methods for forming the lines and ridges include cutting the lines and ridges using an edge tool or embossing the bottom surface of the planar layer with heat to form the parallel indentation lines in the desired direction, i.e., length, width or diagonal, to the desired depth. The ridges preferably maintain an original height or thickness of the planar layer. Therefore, the overall height or thickness of the floor covering remains unchanged.

Figure 7:
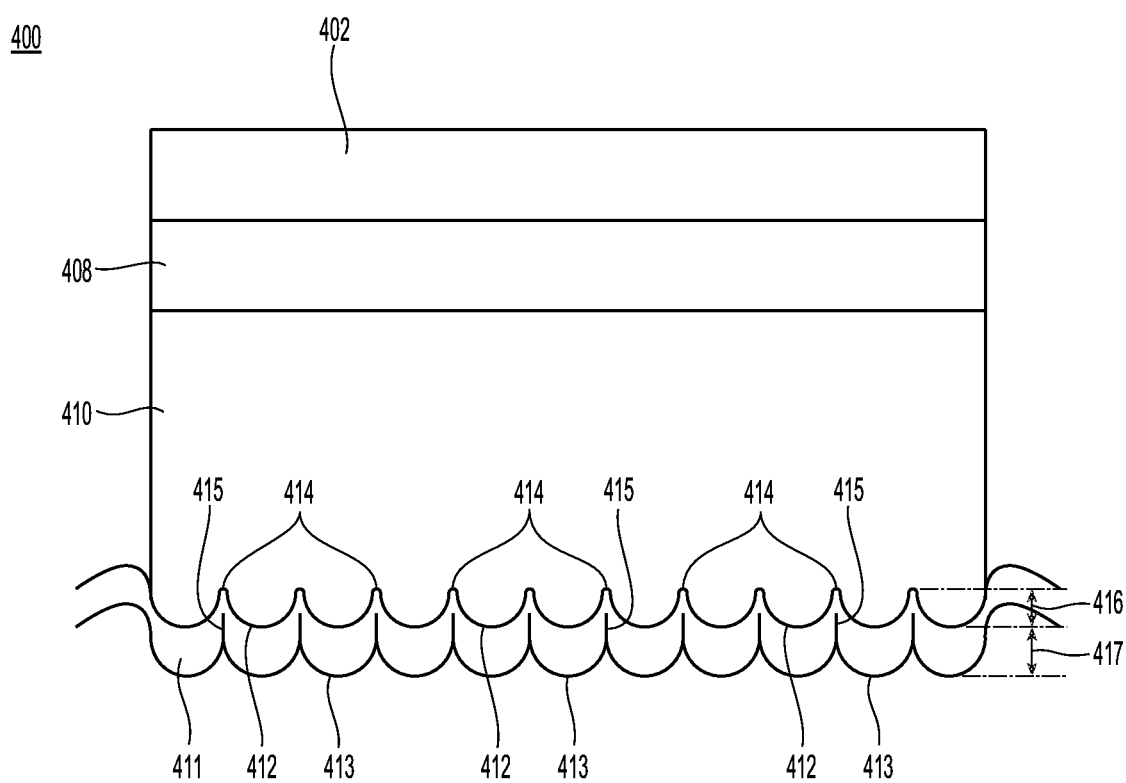
FIG. 7 is a schematic representation of a cross section of another embodiment of a floor covering tile having an additional polymeric layer applied to the bottom surface.

Referring now to FIG. 7, in one embodiment the floor covering 400 includes a planar layer 410. As illustrated, the floor covering also includes the optional face layer 402 and the optional adhesive layer 408 placed over the planar layer 410, which therefore functions as a backing. The floor covering includes an additional layer 411 in contact with the first surface of the planar layer. The additional layer functions as an auxiliary stabilizer or as a barrier to moisture. Suitable additional layers include, but are not limited to, polymer layers and solid conformable films, for example, polyester films that tend to expand or contract less that the remainder of the structure with variations of temperature or humidity. The first surface of the planar layer includes a desired pattern of a plurality of zones. The plurality of zones is arranged as a plurality of parallel ridges 412 on the first surface that run along either the length or width of the planar layer 410. Therefore, the zones are a plurality of discrete, parallel bands forming a regular pattern across the first surface. In one embodiment, each zone occupies an equal portion of the area of the first surface, and the plurality of zones form a regular pattern. In one embodiment, the ridges are rounded. Alternatively, the ridges have an orthogonal or angular shape with relatively sharp corners. The shape of the ridges can be the result of the methods used to form the ridges.

In one embodiment, the ridges are formed or defined by a series of parallel lines of indentations or cuts 414 extending into the planar layer from the first surface. As illustrated, the parallel lines of indentations form rounded indentations within the planar layer. The parallel lines of indentations extend a desired or predefined distance 416 into the planar layer. This predefined distance is up to the height or thickness of the planar layer. In one embodiment, the parallel lines extend between adjacent zones and define lines of separation between adjacent zones.

As illustrated, each zone has identical dimensions across the area of the first surface and into the thickness of the planar layer. This results in the regular pattern of zones. Alternatively, the size of the zones may be varied, for example, by varying the spacing between parallel lines of indentations. In one embodiment, the parallel lines of indentations are closer together near the edges of the floor covering. In one embodiment, the depth the parallel lines of indentations extend into the thickness of the planar layer varies among the parallel lines. In one embodiment, the depth the parallel lines of indentations that extend into the thickness of the planar layer varies along the length of each parallel line, i.e., is deeper adjacent the edges and shallower towards the middle.

In one embodiment, the additional layer, e.g., the polyester film, is attached to the planar layer 410 before formation of the desired pattern of zones. Therefore, the additional layer also includes the same pattern of zones with a plurality of parallel ridges 413 running along either the length or width of the planar layer. These ridges are formed or defined by a series of corresponding parallel lines of indentations or cuts 415 extending into the additional layer and planar layer from the first surface. The ridges and indentations in the additional layer correspond to the locations of the ridges and indentations in the planar layer.

Suitable methods for forming the lines and ridges in the planar layer 410 and additional polymer layer include cutting the lines and ridges using an edge tool or embossing the additional layer and first surface of the planar layer with heat to form the parallel lines of indentations in the desired direction, i.e., length, width or diagonal, to the desired depth. The ridges of either the planar layer or the combination of the planar layer and the additional layer preferably extend and maintain the original height or thickness of the planar layer. Therefore, the overall thickness of the floor covering remains unchanged. In one embodiment, the additional layer adds an additional thickness 417 to the floor covering that is maintained by the plurality of rounded ridges 413.

Figure 8:
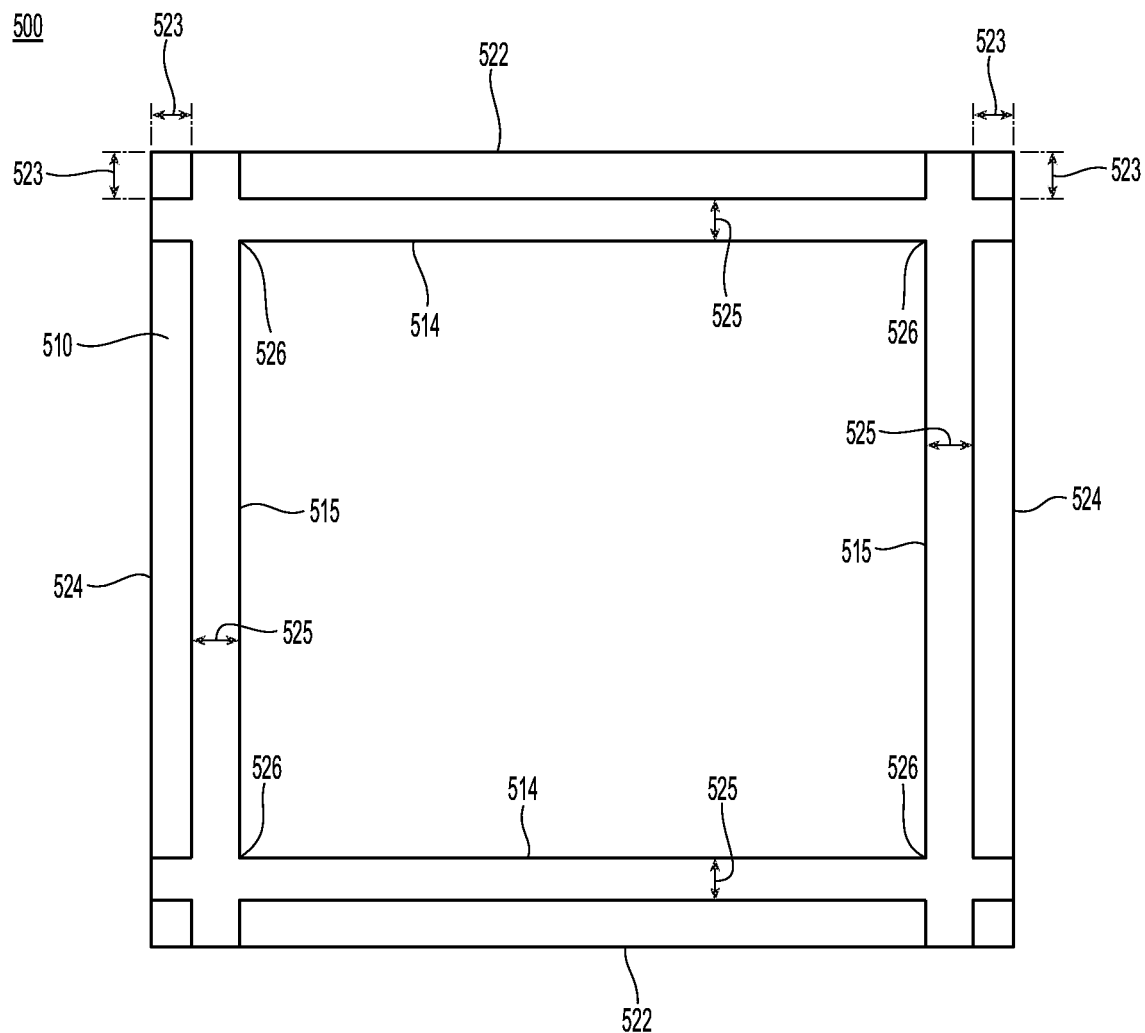
FIG. 8 is a schematic representation of a bottom surface of the floor covering tile having two pairs of parallel channels.

Referring now to FIG. 8, an embodiment the floor covering 500 includes the planar layer 510. In one embodiment, the floor covering also include the optional face layer and adhesive layer, and the planar layer 510 is the backing layer. The first surface of the planar layer includes a desired pattern of a plurality of zones. The plurality of zones includes a plurality of channels cut or embossed into the first service and arranged in a pattern of two pairs of parallel channels. The two pairs of parallel channels include a first pair 515 running parallel to the width edges 524 of the floor covering and a second pair 514 running parallel to the length edges 522 of the floor covering. This arrangement is particularly suitable for structures that tend to have severe problems of up-curl along all four sides.

Each channel is located adjacent to one of the edges and is spaced from the edge by a given distance 523. Each channel may be spaced by the same distance or a different distance from each edge. Suitable distances allow a sufficient amount or width of planar layer adjacent the edges to support the edges and corners of the floor covering, for example, about ¼ inch. In addition, each channel has a given gap width 525 across the bottom face. Each channel can have the same gap width or a different gap width. Suitable gaps can start from about zero, representing a thin cut line, to a substantial part of the width of the floor covering tile, provided that the depth of the channel in combination with its width does not allow the floor covering tile to sag down within the channel. In one embodiment, each channel has a rectangular or square cross section. Other suitable shapes for the cross section include rounded, circular or triangular.

Each channel preferably extends an entire length of a given edge to which it is adjacent. Therefore, the two pairs of channels define or create four overlaps 526. Suitable methods for forming the pairs of parallel channels include, but are not limited to, cutting the channels using an edge tool or other suitable cutting instrument and embossing the first surface of the planar layer with heat to form the channels in the desired direction and length and to the desired depth. While cut-out channels are illustrated, in one embodiment the pattern of zones is achieved with indentations formed in the first surface of the planar layer by embossing with pressure and heat, or by simple slicing to a limited depth. In one embodiment, the pattern of zones is achieved through modification of other physical properties in the planar layer, e.g., a modification of planar layer density. In one embodiment, channels are not cut into the planar layer, but an amount of additional material is attached to or inserted into the first surface of the planar layer in all areas of the planar layer outside the zones, i.e., not covered by the two pairs of parallel channels illustrated in FIG. 8. The additional material builds up at least one of the local thickness, density and rigidity of the planar layer. Suitable additional material includes, but are not limited to, a coating, a fabric and a film.

Figure 9:
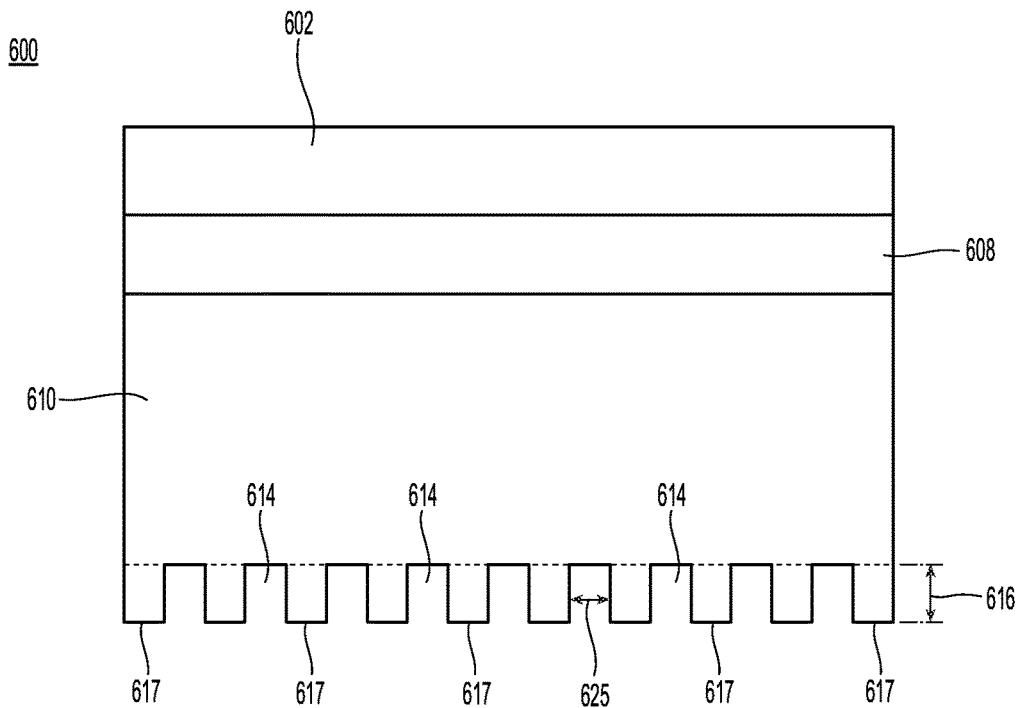
FIG. 9 is a schematic representation of a cross section of another embodiment of a floor covering tile.
Figure 10:
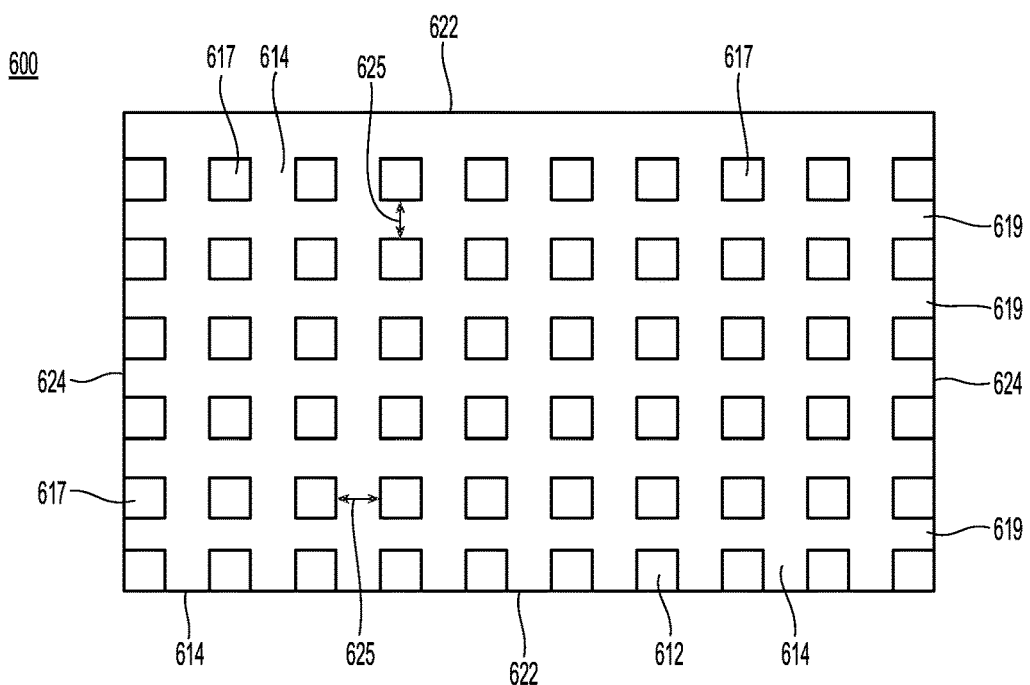
FIG. 10 is a schematic representation of a bottom surface of the floor covering tile of FIG. 9.

Referring now to FIGS. 9 and 10, in one embodiment the floor covering 600 includes a planar layer 610. As illustrated, the floor covering also includes the optional face layer 602 and adhesive layer 608 placed on the planar layer. The first surface of the planar layer includes a plurality of zones. Each zone in the plurality of zones is a channel, and the zones in the plurality of zones are arranged in a pattern containing two sets of parallel intersecting channels that result in a grid pattern of interrupted channels. Therefore, the plurality of zones, each of which occupies an equal portion of the area of the first surface of the planar layer, forms a regular pattern having both parallel bands or channels and perpendicular bands or channels. This arrangement is particularly effective in allowing the surface covering to conform to floor surface variations and deformations and in counteracting a tendency of warping with large temperature and humidity variations during use.

In one embodiment, the channels are formed by removing material or by embossing in two different directions and forming a grid. The channels are parallel to the length and width, i.e., the edges, of the planar layer. In one embodiment, each channel has a rectangular or square cross section. Other suitable shapes for the cross section include rounded, circular, triangular, rhombical and elliptical.

In one embodiment, the two sets of parallel channels include a first set of parallel channels 614 running parallel to the width edges 624 of the floor covering and a second set of parallel channels 619 running parallel to the length edges 622 of the floor covering. Each channel has a given gap width 625 across the first surface. Each channel width can vary from simple slits to a width that is not too large to cause depressions in the assembled product. All channels can have the same width, or their widths can vary. In one embodiment, each channel has a rectangular or square cross section. Each channel extends into the planar layer a desired or predefined distance 616. The predefined distance can be identical for each channel or can vary from channel to channel. In one embodiment, the predefined distance varies along each channel. This predefined distance can extend up to about the height or thickness of the planar layer.

In one embodiment, the two sets of parallel channels form a plurality of pillars 617. Each pillar has a height corresponding to the predefined distance 616 that each channel extends into the planar layer. As illustrated, each pillar has a rectangular cross section. The pillars can have other cross-sectional shapes including for example, circular, elliptical and triangular. In one embodiment, the plurality of pillars forms a regular grid across the first surface of the planar layer. In one embodiment, the channels and pillars form a pattern that is uniform across the first surface of the planar layer. Alternatively, the formed pattern varies from area to area. In one embodiment, the formed pattern is different at areas adjacent to the edges from the areas disposed within the middle. In addition to being arranged in a varying patter, the individual pillars and channels can vary in depth, width or shape across different areas. Suitable methods for forming the plurality of channels include cutting the channels using an edge tool or other suitable cutting tool and embossing the first surface of the planar layer with heat to form the parallel indentation lines in the desired direction, i.e., length, width or diagonal, to the desired depth. The pillars preferably maintain most of the original height or thickness of the planar layer. The floor covering composite balances out into a conformable flat or slightly doming structure, convenient for use as a flooring tile.

Figure 11:
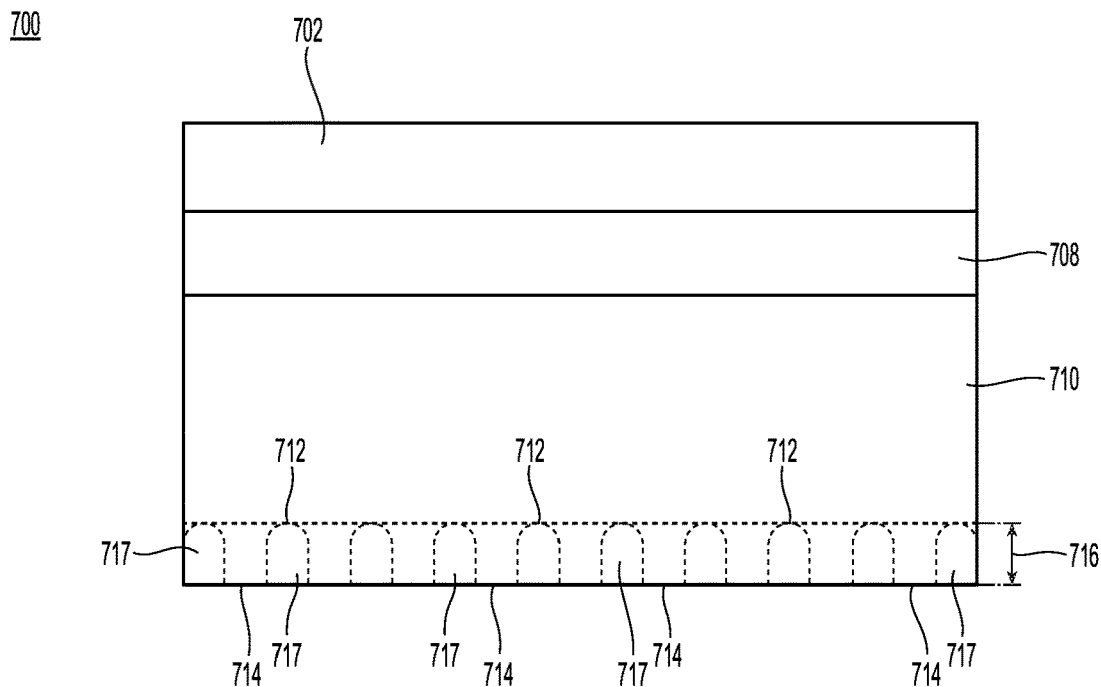
FIG. 11 is a schematic representation of cross section of another embodiment of a floor covering.
Figure 12:
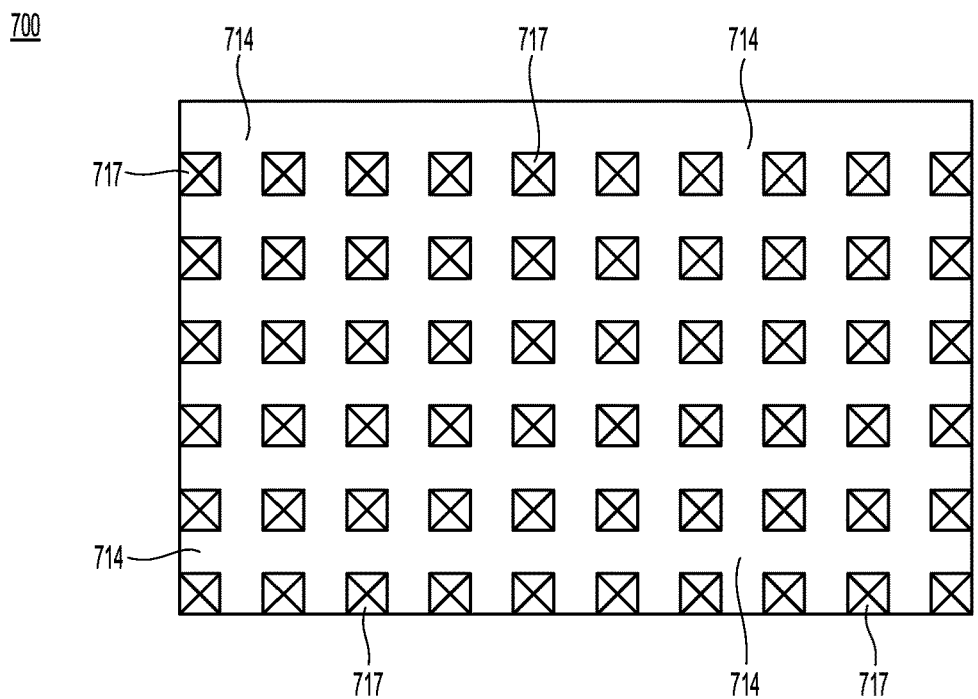
FIG. 12 is a schematic representation of a bottom of the floor covering tile of FIG. 11.

Referring now to FIGS. 11 and 12, in one embodiment the floor covering 700 includes a planar layer 710. As illustrated, the floor covering also includes the optional face layer 702 and optional adhesive layer 708 attached to the planar layer. The planar layer includes a plurality of zones discrete zones arranged in a regular pattern. Each zone is an indentation 717 extending into the planar layer a given distance 716. In one embodiment, the indentations have a rounded or curved bottom 712. The plurality of indentations is arranged in a regular pattern having lines running in two different directions forming a grid of elevated areas 714 between the indentations. The two sets of parallel lines of indentations can be perpendicular or may meet at an angle other than or less than 90 degrees. The parallel lines of indentations can be parallel to the length and width, i.e., the edges, of the planar layer, or each set of parallel lines can intersect both edges of the planar layer. This arrangement is particularly useful in adding a degree of planar stability to a floorcovering having bulky and cushioning lower strata by reverse-embossing or by localized drilling or abrasive removal of material, without substantially affecting overall bulk and cushion.

Suitable methods for forming the plurality of indentations 717 also include cutting or embossing the first surface of the planar layer with heat and pressure. The grid formed by the elevated areas 714 preferably maintains most of the thickness of the planar layer. The floor covering composite balances out into a flat or slightly doming structure, convenient to use as a flooring tile.

Figure 13:
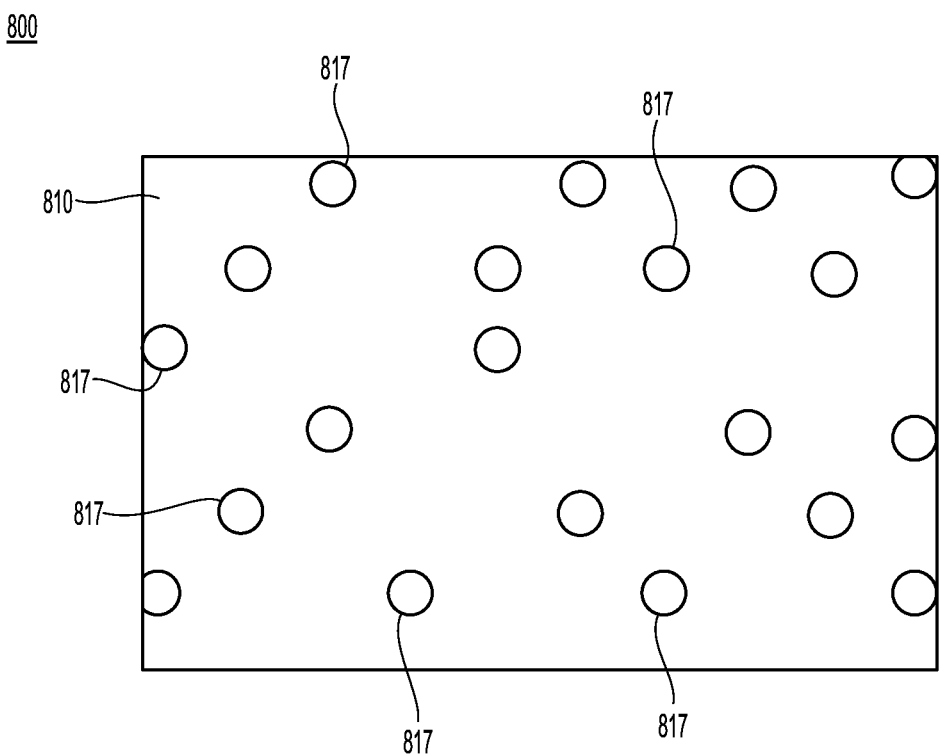
FIG. 13 is a schematic representation of a bottom surface of a floor covering tile having a plurality of localized areas having different properties from the remainder of the floor covering tile.
Figure 16:
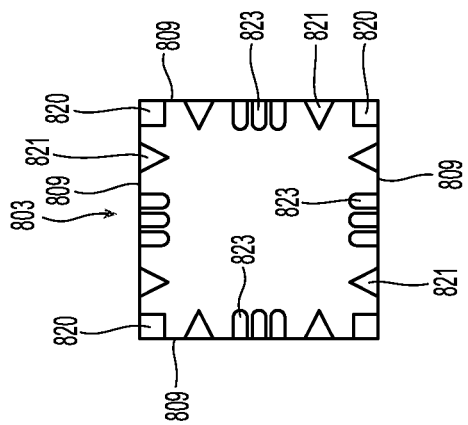
FIG. 16 is a schematic representation of another backing of a floor covering tile having a plurality of areas differing in physical properties from the remainder of the backing and located at the edges of the floor covering tile.
Figure 15:
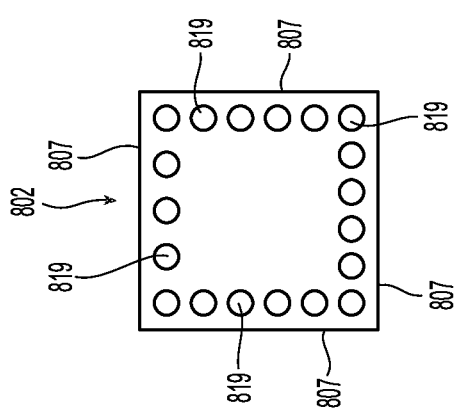
FIG. 15 is a schematic representation of a planar layer of a floor covering tile having a plurality of areas differing in physical properties from the remainder of the floor covering tile and located at the edges of the floor covering tile.
Figure 14:
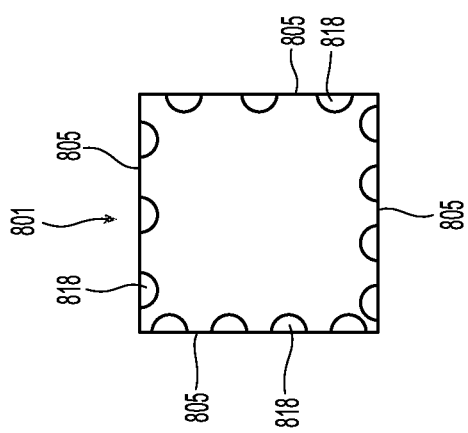
FIG. 14 is a schematic representation of a bottom of a floor covering tile having a plurality of localized areas having different properties from the remainder of the floor covering tile concentrated near the outer edges of the floor covering tile.

Referring now to FIG. 13, in one embodiment the floor covering tile 800 includes a planar layer 810 having a plurality of discrete zones arranged in a random pattern. The plurality of zones includes a plurality of discrete areas 817 having different properties from the other remaining areas of the floor covering or planar layer and arranged in a random pattern across the first surface of the planar layer. Each discrete area 817 covers a given portion of the area of the first surface of the planar layer. The given portions can be uniform in size and shape across all discrete areas or can vary between two of more of the discrete areas. Each discrete area represents a region having different properties from the remaining area of the floor covering, and these different properties extend from the first surface of the planar layer a distance or depth into the planar layer. In one embodiment, this distance is up to the height or thickness of the planar layer. FIGS. 14-16 illustrate other arrangements of these discrete zones that are regions having different properties from the remaining area of the floor covering.

Referring now to FIG. 14, in one embodiment, the floor covering tile 801 includes a planar layer. The planer layer includes a plurality of zones that is a plurality of discrete zones or areas disposed or concentrated along the plurality of edges 805 of the floor covering tile 801. Each discrete area extends from an edge toward the center of the floor covering tile. However, the discrete areas are spaced from each other along the edge.

Referring to FIG. 15, in one embodiment, the floor covering tile 802 includes a planar layer. The planar layer includes a plurality of discrete zones arranged in a regular pattern. The plurality of zones is a plurality of discrete areas 819 disposed along the edges 807 of the floor covering tile 802, but each discrete area is adjacent to and spaced from an edge. As illustrated, each discrete area has an identical shape and occupies an equal portion of the first surface of the planar layer.

Referring to FIG. 16, in one embodiment, the floor covering tile 803 includes a planar layer. The planar layer includes a plurality of discrete zones having a plurality of different shapes and arranged in a regular pattern. The plurality of discrete zones is a plurality of discrete areas disposed along the edges 809 of the floor covering tile 803 and extending from an edge toward the center of the tile. Each discrete area, however, does not have an identical shape. The plurality of discrete areas each have one of a plurality of different shapes, including for example, square 820, triangular 821, oblong 823 and elliptical among others.

Suitable methods for forming the plurality of discrete areas of varying properties include, but are not limited to, cutting using an edge tool or other suitable cutting tool, embossing the bottom surface, heating the bottom surface and adding material to the bottom surface. In one embodiment, material added to the bottom surface is absorbed into the planar layer and does not change the local thickness. Alternatively, the material added to the bottom surface increases the local thickness.

Figure 17:
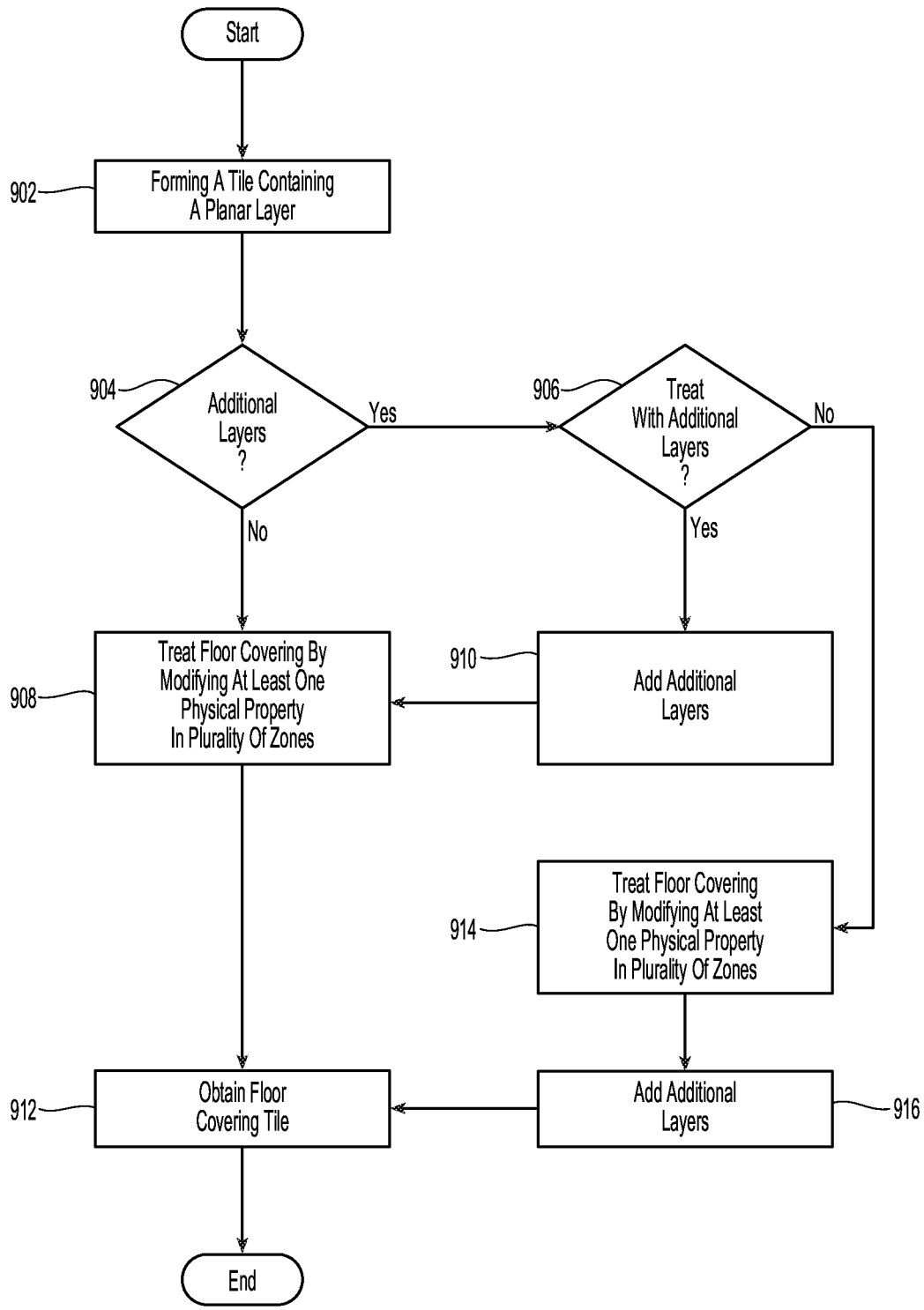
FIG. 17 is a flow chart illustrating an embodiment of a method for making a floor covering tile with a desired pattern of locally varying physical properties.

Exemplary embodiments are also directed to methods for creating a floor covering or floor covering or tile that includes a desired pattern or variability of properties across the area of the floor covering or floor covering tile. Referring to FIG. 17, an exemplary embodiment of a method of making a floor covering 900 is illustrated. A tile containing a planar layer is formed 902. A determination is made regarding whether additional layers, i.e., the face layer and adhesive layer, are to be included in the floor cover tile 904. If no additional layers are to be added, then the floor covering tile is treated by modifying at least one physical property of the planar layer in a plurality of zones disposed across a first surface of the planar layer 908, and a treated floor covering tile is obtained 912. Each zone occupies a portion of an area of the first surface and represents a variation in at least one physical property of the planar layer.

In one embodiment, modifying the physical property of the planar layer includes embossing the first surface or making cuts into the first surface. In one embodiment, modifying the physical property of the planar layer includes removing material from the first surface, forming channels in the first surface, forming indentations in the first surface or forming protrusions on the first surface. In one embodiment, modifying the physical property of the planar layer includes heating and thermo-bonding the plurality of zones on the first surface. In one embodiment, modifying the physical property of the planar layer includes at least one of depositing materials onto the first surface and incorporating materials into the planer layer from the first surface.

If additional layers are to be added to the floor covering tile, then a determination is made regarding whether the floor covering tile is to be treated with the additional layers or without the additional layers 906. If the floor covering tile is to be treated without the additional layers, then the floor covering tile is treated by modifying at least one physical property of the planar layer in a plurality of zones disposed across a first surface of the planar layer 914. Each zone occupies a portion of an area of the first surface and represents a variation in at least one physical property of the planar layer.

In one embodiment, modifying the physical property of the planar layer includes embossing the first surface or making cuts into the first surface. In one embodiment, modifying the physical property of the planar layer includes removing material from the first surface, forming channels in the first surface, forming indentations in the first surface or forming protrusions on the first surface. In one embodiment, modifying the physical property of the planar layer includes heating and thermo-bonding the plurality of zones on the first surface. In one embodiment, modifying the physical property of the planar layer includes at least one of depositing materials onto the first surface and incorporating materials into the planer layer from the first surface.

Having treated the planar layer, additional layers, e.g., at least one of a face layer and an adhesive layer, are attached to a second surface of the planar layer opposite the first surface 916, and a treated floor covering tile is obtained. Therefore, a face layer is attached to a second face of the planar layer opposite the first face following modification of the at least one physical property of the planar layer in the plurality of zones.

If the floor covering tile is to be treated with the additional layers, e.g., at least one of a face layer and an adhesive layer, are added to the floor covering tile 910. Then the floor covering tile is treated by modifying at least one physical property of the planar layer in a plurality of zones disposed across a first surface of the planar layer 908. As the additional layers including the face layer are attached, at least one physical property is modified in at least one of the planar layer and the face layer or any additional layers. Suitable methods for modifying the physical properties of the planar layer and any additional layer are discussed herein. The treated floor covering tile is then obtained 912.

Any type of physical property modification, zone and pattern of zones discussed herein can be used in the method to obtain the desired treated floor covering tile. In one embodiment, the planar layer is formed and treated to create the desired pattern of variable properties in a single step. In one embodiment, the top surface of the floor covering tile is also treated, for example, to provide the desired aesthetic, for example, using printing or embossing. In one embodiment, the top surface is treated to improve surface durability, for example, using heating or embossing. The top surface can be treated either before or after the bottom surface is treated.

In general, the patterns formed in the bottom surface of the floor covering tiles prevent doming or curling of the floor covering. In one embodiment, the bottom surface of the planar layer is indented with the desired pattern. In one embodiment, forming the desired pattern in the planar layer includes forming indentations by embossing with heat and pressure applied from the bottom surface of the planar layer. In one embodiment, the indentations are parallel lines running in the longitudinal or cross-directions or in both directions across the length and width of the planar layer. In one embodiment, the indentations follow a parallel longitudinal or cross directional pattern along the edges of the floor covering tile. In one embodiment, the indentations represent areas of uniform or variable size surrounding adjacent areas of full thickness or height planar layer.

In one embodiment, an additional, continuous polymeric layer is added to the bottom surface of the tile planar layer. This additional, continuous polymeric layer conforms to the indented surface geometry. Suitable additional, continuous polymeric layers include a film or membrane. In one embodiment, the additional, continuous polymeric layer is a polyester layer. In one embodiment, the additional, continuous polymeric layer is added to the bottom surface of the tile planar layer before the desired pattern is formed in the planar layer. In one embodiment, the additional polymeric layer on the bottom surface conforms to any geometry on the bottom surface including channeled geometry.

In one embodiment, the forming of the desired pattern, e.g., the indented geometry, in the planar layer is conducted before placing the fibrous face layer in contact with the planar layer. In one embodiment, forming the desired pattern includes creating channels from which material is missing or has been removed. In one embodiment, forming the desired pattern includes slitting the bottom surface to a limited depth with various slitting patterns and various widths of slits.

In one embodiment, forming the desired pattern includes combining one or more uniform sublayers and one or more variable sublayers together to form a planar layer with the desired pattern. In one embodiment, the desired pattern is variability planar layer caused by the weight of property-changing elements placed in different areas. In one embodiment, the variability is caused by selectively embedding fibrous or nonfibrous materials into the bottom surface planar layer. In one embodiment, the property-changing elements are high-density fillers. In one embodiment, the property-changing elements are resins or binders locally added to the planar layer. In one embodiment, the differential properties in various areas of the planar layer are caused by differential heat treatment applied to the planar layer. In one embodiment, the planar layer and the desired pattern are formed by foamed expansion. Variations in the physical properties of the planar layer that create the desired pattern can be gradual or abrupt or sudden.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A floor covering tile comprising:
a top surface of the floor covering tile;
a bottom surface of the floor covering tile;
a planar backing layer comprising:
 a first surface;
 a second surface opposite the first surface;
 a length; and
 a width perpendicular to the length, the length and width defining an area of the first surface of the planar backing layer, wherein the first surface of the planar backing layer faces the bottom surface of the floor covering tile; and
a fibrous textile face layer having top face and a bottom face, wherein the bottom face of the fibrous textile face layer is attached to the second surface of the planar backing layer and the top face of the fibrous textile layer faces the top surface of the floor covering tile; and
an adhesive layer disposed between the fibrous textile face layer and the planar backing layer,
wherein a plurality of zones are disposed across the area of the first surface of the planar layer, each zone occupying a portion of the area and comprising a variation in at least one physical property along the length or the width of the planar backing layer to counteract warping due to changes in temperature and humidity of the face layer and the planar layer, and
wherein each zone occupies an equal portion of the area of the first surface of the planar backing layer and comprises an identical shape.

2. The floor covering tile of claim 1, wherein the physical property is selected from the group consisting of material composition, weight, density, directionality, stiffness, compressibility, and elasticity.

3. The floor covering tile of claim 1, wherein the plurality of zones comprises a plurality of discrete zones.

4. The floor covering tile of claim 1, wherein the plurality of zones forms a regular pattern across the first surface of the planar backing layer.

5. The floor covering tile of claim 1, wherein the floorcovering further comprises a thickness between the first surface and the second surface of the planar backing layer and each zone extends into the planar backing layer partially through the thickness of the planar layer.

6. The floor covering tile of claim 5, wherein each zone extends an equal distance through the thickness.

7. The floor covering tile of claim 1, wherein:
the floor covering tile has a plurality of edges; and
each zone in the plurality of zones is disposed along the plurality of edges.

8. A floor covering tile comprising:
a top surface of the floor covering tile;
a bottom surface of the floor covering tile;
a planar backing layer comprising:
 a first surface;
 a second surface opposite the first surface;
 a length; and
 a width perpendicular to the length, the length and width defining an area of the first surface of the planar backing layer, wherein the first surface of the planar backing layer faces the bottom surface of the floor covering tile; and
a fibrous textile face layer having top face and a bottom face, wherein the bottom face of the fibrous textile face layer is attached to the second surface of the planar backing layer and the top face of the fibrous textile layer faces the top surface of the floor covering tile; and
an adhesive layer disposed between the fibrous textile face layer and the planar backing layer,
wherein a plurality of zones are disposed across the area of the first surface of the planar layer, each zone occupying a portion of the area and comprising a variation in at least one physical property along the length or the width of the planar backing layer to counteract warping due to changes in temperature and humidity of the face layer and the planar layer, and
wherein the plurality of zones comprises a plurality of bands extending across the first surface of the planar backing layer.

9. The floor covering of tile claim 8, wherein the plurality of bands comprises at least one of a plurality of parallel bands and a plurality of overlapping bands.

10. A method for making a floor covering tile, the method comprising:
forming a tile comprising a top surface, a bottom surface, a planar backing layer, and a fibrous textile face layer by attaching a bottom face of the fibrous textile face layer to a second surface of the planer backing layer, wherein the planar backing layer includes a first surface opposite of the second surface and that faces the bottom surface of the tile, wherein the fibrous textile face layer includes a top face opposite of the bottom face and that faces the top surface of the tile, and wherein an adhesive layer is disposed between the fibrous textile face layer and the planar backing layer; and
modifying at least one physical property along a width or a length of the planar layer in a plurality of zones disposed across a first surface of the planar layer to modify a rate of expansion and contraction due to changes in temperature of the planar backing layer, each zone occupying a portion of an area of the first surface of the planar backing layer, and extending partially from the first surface of the planar backing layer to the second surface of the planar backing layer,
wherein modifying the physical property of the planar backing layer comprises removing material from the first surface of the planar backing layer, forming channels in the first surface of the planar backing layer, forming indentations in the first surface of the planar backing layer or forming protrusions on the first surface of the planar backing layer.

11. The method of claim 10, wherein modifying the physical property of the planar backing layer comprises embossing the first surface of the planar backing layer or making cuts into the first surface of the planar backing layer.

12. The method of claim 10, wherein modifying the physical property of the planar backing layer comprises at least one of depositing materials onto the first surface of the planar backing layer and incorporating materials into the planar backing layer from the first surface of the planar backing layer.

13. The method of claim 10, wherein the fibrous textile face layer is attached to the planar backing following modification of the at least one physical property of the planar backing layer in the plurality of zones.

14. A floor covering tile, comprising:
a top surface of the floor covering tile;
a bottom surface of the floor covering tile;
a planar backing layer comprising four edges defining an area of the planar backing layer, wherein the planar backing layer has a first side and a second side opposite the first side, wherein the first side faces the bottom surface of the floor covering tile and the second side faces the top surface of the floor covering tile; and
a fibrous textile face layer having top face and a bottom face, wherein the bottom face of the fibrous textile face layer is attached to the second surface of the planar backing layer and the top face of the fibrous textile layer faces the top surface of the floor covering tile; and
an adhesive layer disposed between the fibrous textile face layer and the planar backing layer,
wherein the planar layer further comprises a plurality of discrete and separate zones spaced along each edge, each zone occupying a portion of the area and comprising a variation in at least one physical property along a length or a width of the planar layer to counteract expansion and contraction due to changes in temperature of the planar backing layer.

15. The floor covering tile of claim 14, wherein each zone extends in from an edge toward a center of the planar backing layer.

16. A floor covering tile comprising:
a top surface of the floor covering tile;
a bottom surface of the floor covering tile;
a planar backing layer comprising:
 a first surface;
 a second surface opposite the first surface;
 a length; and
 a width perpendicular to the length, the length and width defining an area of the first surface of the planar backing layer, wherein the first surface of the planar backing layer faces the bottom surface of the floor covering tile; and
a fibrous textile face layer having top face and a bottom face, wherein the bottom face of the fibrous textile face layer is attached to the second surface of the planar backing layer and the top face of the fibrous textile layer faces the top surface of the floor covering tile; and
an adhesive layer disposed between the fibrous textile face layer and the planar backing layer,
wherein a plurality of zones are disposed across the area of the first surface of the planar layer, each zone occupying a portion of the area and comprising a variation in at least one physical property along the length or the width of the planar backing layer to counteract warping due to changes in temperature and humidity of the face layer and the planar layer, and
wherein the fibrous textile face layer comprises the length, the width perpendicular to the length, and the area of the planar backing layer.

* * * * *